Jan. 6, 1953 A. WITTLIN 2,624,308
LIQUID FLOW INDICATOR
Filed Aug. 21, 1948
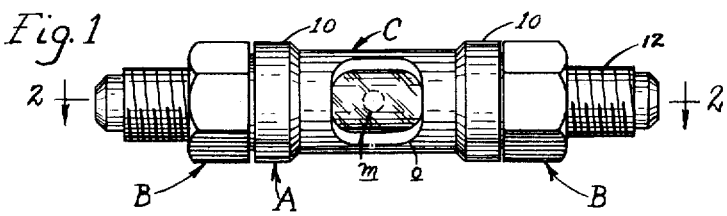
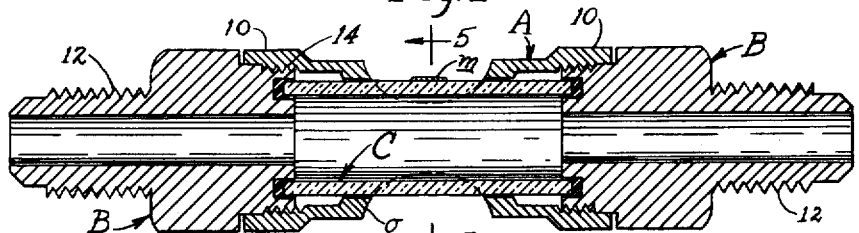
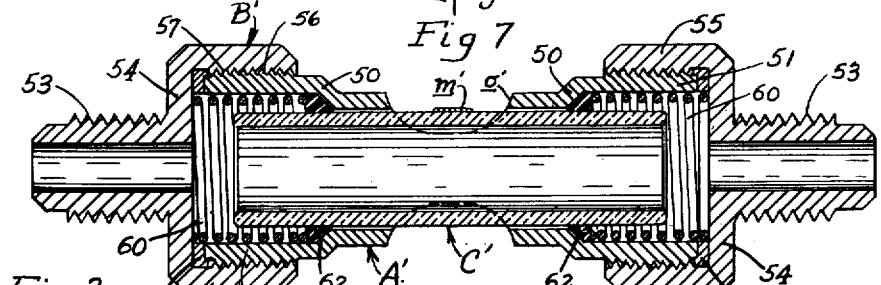
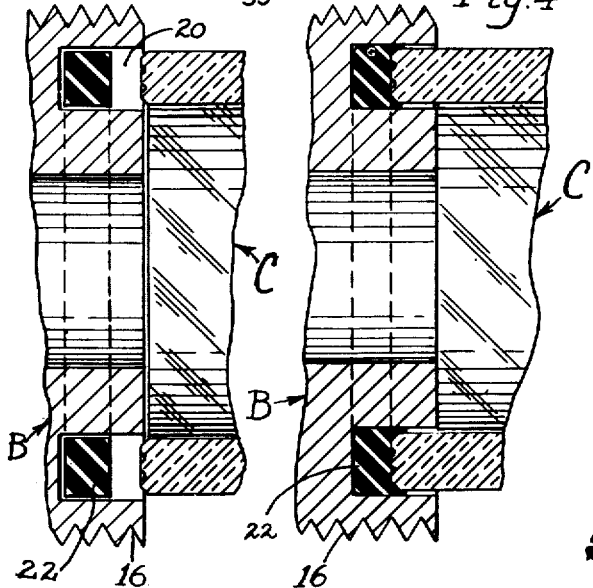
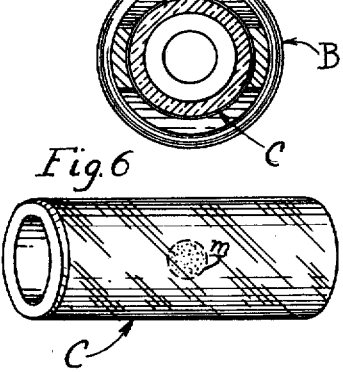
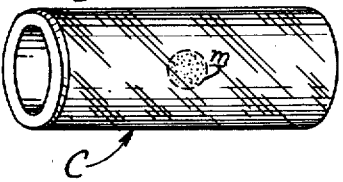
INVENTOR.
Albert Wittlin
BY
Flemming & Flemming
Attys.

Patented Jan. 6, 1953

2,624,308

UNITED STATES PATENT OFFICE 2,624,308

LIQUID FLOW INDICATOR

Albert Wittlin, Chicago, Ill.

Application August 21, 1948, Serial No. 45,533

6 Claims. (Cl. 116—117)

My invention relates to an indicator adapted to be interposed in a fluid system whereby to reveal not only the presence of a fluid passing therethrough, but also in many cases its condition as well. This indicator has numerous advantages in the direction of simplicity, strength, proof against leakage and breakage, and also the ease with which it may be installed and used. A floating mounting is also provided for a sight glass that is comprised in the indicator, the glass being thereby maintained out of contact with the surrounding parts of metal whereby to receive enhanced protection during assembly, shipping, installation, and changing thermal conditions. In addition, the operation of assembly involves a novel and improved procedure, all as will hereinafter be pointed out.

These objects and advantages, as well as others, may be realized in good measure from my invention of which certain embodiments are illustrated in the accompanying drawing wherein—

Figure 1 is a view in side elevation of the present indicator in its entirety;

Fig. 2 is a longitudinal section through the indicator, taken on line 2—2 of Fig. 1;

Fig. 3 is an enlarged detail in section showing one end of the glass cylinder in proximate relation to the gasket with which it coacts when fitted within the seat therefor;

Fig. 4 which is a similar view shows the cylinder end as it appears when pressed against the gasket to deform the latter laterally within its seat;

Fig. 5 is a transverse section, taken on line 5—5 of Fig. 2;

Fig. 6 is a view in perspective of the glass cylinder which forms part of the indicator; and Fig. 7, which is a view similar to Fig. 2, shows a liquid indicator having a slightly modified construction.

The liquid indicator of this invention has been designed to meet certain rather special conditions such as are present, for example, with a liquid refrigerant in a closed system. It has the advantage of offering no resistance to the flow of the refrigerant therethrough beyond that which is regularly encountered when moving through any pipe line. Nor are there any turns or constrictions tending to obstruct or disturb the liquid in its movement through the indicator. Because of this provision for free flowing, the condition of the liquid as it appears to the eye when passing through the present indicator may be accurately judged from the standpoints of rapidity of flow and the presence of air, oil, solids, etc.

The indicator comprises a generally cylindrical tubular housing A which is symmetrical in that at each end it is slightly outset at 10 where it joins with a coupling fitting B of desired type hereinafter referred to as a "head." Each head is threaded at 12 for screw-threaded connection with other constituents in the system (not shown) through which a liquid or gas is flowed. The outset ends of the housing A provide interiorly thereof chambers of slightly enlarged diameter wherein may be received the heads B for a distance sufficient to establish therewith a separable connection by means of coacting screw threads 14 and 16.

The inner end of each head is formed with an annular channel 20 forming a deep seat for reception of a resilient gasket 22. The outer wall of the channel in each head may be coradial with the internal diameter of the housing throughout its medial region wherein is accommodated a transparent cylinder C of glass or the like. Each end of this cylinder is disposed in a plane transversely of its axis, and the cylinder length is such that its two ends will lie within the channels 20 and advance therewithin to compress the gaskets in response to endwise movement of the heads upon the housing whereon they are carried. Opposite walls of the housing are formed with openings o constituting windows through which may be seen the glass cylinder C as well as the passing fluid therewithin. The outside diameter of the cylinder C is slightly less than the outside diameter of the channel 20 and of the tubular housing A for a purpose which will presently appear.

The normal cross sectional contour of each gasket is such that it may be fitted easily in place (see Fig. 3), but under pressure it is subject to deformation and to displacement about as indicated in Fig. 4. In this deformed and displaced condition each gasket is expanded laterally within its seat. Initially it may fit loosely within the seat, but under pressure, as when the heads B are advanced upon the housing A in response to proper rotation of the parts, each gasket is laterally spread so as to firmly engage with opposite sides of the seat and is also displaced outwardly therefrom for a slight distance into the narrow annular spaces interiorly and exteriorly of the cylinder C. The cylinder ends, each in engagement with one gasket, are desirably blunted as by being rounded or beveled slightly along opposite circular edges so as to facilitate flowing past these points of the gasket material which may be rubber, or a composition thereof, either natural or synthetic. The presence of the gasket material between the glass cylinder walls and the adjacent walls of the supporting structure provides a cushion or floating mounting which prevents direct contact between the cylinder and the housing or the heads.

The glass cylinder carries on its wall at a point which is within the confines of one of the window openings one or more opaque marks m (see Figs. 1, 2, and 4) for a special purpose. This mark (or marks) may be in the form of a dot, line, figure, or other readily discernible object, single or multiple, so as to be visible from the side of the glass which is opposite thereto. When a liquid that is more or less clear is flowing through the glass cylinder, the mark m on its far side will reveal to the practiced eye various things. The mark will become greatly magnified for one thing. It will tend also to become distorted. When less than a full stream is flowing through the indicator, the mark will have a still different appearance. To one who becomes familiar with the various conditions encountered with the use of the different liquids with which the present indicator may be used to advantage, these various distortions will carry a definite meaning. In this manner the indicator will reveal to the trained operator conditions which exist at the moment, so that, if not right, steps may be taken promptly to rectify them.

It will be noted from Fig. 5 in particular that the walls of the housing A are relatively thick, so that the glass cylinder is disposed well inwardly of its outer surface. As a result the rather deep edges which border the window opening o provide, in effect, a shadow box whereby to intensify the readings through the glass. A high degree of protection to the glass is also afforded by this arrangement.

In the modified construction of Fig. 7, I employ a tubular housing A' having in each opposite end region an outwardly slanting shoulder 50 beyond which is an outset cylindrical wall 51 defining therewithin an enlarged chamber. A coupling fitting B' comprising a tubular nipple 53 joined at one end to a radial wall 54 from which extends an annular flange 55 may be used to connect with each end of the housing. For this purpose each outset cylindrical wall 51 of the housing is, as shown, exteriorly threaded at 56 for coaction with complementary threads 57 that are provided interiorly of the flange 55. A sealing gasket 58 of copper or the like, disposed opposite each end of the housing, is carried by the associated coupling fitting B' to be compressed thereby when forced against the housing end in response to rotative advancement of the coupling which, for convenience, is sometimes referred to herein as a "head."

A cylinder C' of glass or the like is positioned within the tubular housing A'. The length of this cylinder is such that its opposite end portions are extended well into the chamber which is defined by the outset cylindrical wall 51 at each end of the tubular housing. Between each end portion of the glass cylinder C' and the surrounding outset wall 51 of the housing is an annular space wherein is accommodated a coiled wire spring 60 whose outer end abuts the wall 54 of the coupling fitting B'. A pair of compression gaskets 62, of rubber or the like, is fitted around the glass cylinder, one adjacent each slanting shoulder 50 and each in position to be engaged by the inner end of the coiled spring 60. The spring in each case constitutes a yielding means associated with the head for transmitting therefrom an axially directed pressure whereby to compress the associated gasket. By the arrangement and operation of the parts comprised in this construction, the springs 60 exert an endwise pressure upon the two gaskets 62, and because of the slanting surfaces of the shoulders 50 there is an enhanced tendency for the gaskets to advance radially inwardly thereby assuming the form of spaced circular cushions between the tubular housing and the glass cylinder carried thereby. A floating mounting for the cylinder is thereby provided such that it is maintained out of contact with all adjacent metallic surfaces. Each of the cushioning gaskets 62 will remain tightly and indefinitely in place due to the expansive force of its associated spring 60.

Opposite walls of the tubular housing A' in its medial region are formed with openings o' constituting windows through which may be seen the glass cylinder C' as well as the passing fluid therewithin. A mark m' in the form of a dot or other figure is desirably carried by the glass cylinder at a medial point so as to be visible when viewed through the window remote therefrom.

In the process of assembly of the parts of the present liquid indicator it is important that the glass cylinder be rotatively positioned so that the mark m be opposite one of the two windows in the tubular housing. It is somewhat difficult to do this because of the rotative movements which the two heads execute when being affixed to the housing. During advance to final positions the heads tend to transmit a rotary movement to the cylinder thereby moving it away from an initial position wherein the mark m may have been correctly centered. To overcome any such tendency each compression gasket which bears against the cylinder is initially oiled so as to become slippery to a high degree. As a result, the gaskets will permit the cylinder to be freely rotated so long as the heads are not advanced close to their finally adjusted positions. It is advantageous, therefore, to assemble the cylinder in place between the oiled gaskets, then advance the heads to the point of transmitting a light pressure to the cylinder, then manipulate the cylinder by a light finger pressure through the window of the housing to rotate the cylinder to the desired position, and then advance the heads by a further rotative movement to their final positions. If necessary, the finger pressure on the cylinder may be retained while the heads are so finally advanced.

In the construction of Fig. 3 where the compression gaskets are located at the ends of the cylinder, it will be found that when endwise pressure develops through advance of the heads the cylinder will be self-centered with respect to the annular channels 20 wherein the cylinder ends are disposed. This is due in part to the slippery condition of the resilient material of the gaskets which tends to work its way around the inner and outer edges of the cylinder to enter slightly into the surrounding space. The cylinder is thereby centered with respect to the channels in the heads which are carried on the ends of the tubular housing, so as to be maintained out of contact with the housing itself; in this central position the cylinder is supported entirely by the compression gaskets which afford a leak-proof and cushion mounting therefor.

The construction of the present indicator is simple in the extreme, and it may be put together or taken apart quickly and with very little effort. The liquid stream is permitted to move in a straight path through the indicator, with little or no frictional resistance encountered. The flowing stream remains placid and quiet to facilitate a reading therethrough of the telltale mark on the far side of the glass cylinder. The indicator structure is compact and strong, and there need be no leakage around the glass cylinder against which pressure is exerted by resilient gaskets which in turn are deformed to enter into the surrounding space whereby to provide a floating mounting for the cylinder.

Certain features of the indicators disclosed, but not claimed herein, are claimed in my co-pending application, Serial No. 304,751, filed August 16, 1952, which is a continuation-in-part of this application.

This is a continuation in part case in respect of my application filed October 25, 1947, Serial No. 782,089 (now abandoned).

I claim:

1. For use in the pipeline of a closed circulatory fluid system to show the rate of flow and the condition of the fluid, a liquid indicator designed to be located in said pipeline and having a straight liquid passage through which all the liquid of the system passes and which is devoid of turns, constrictions and obstructions offering resistance to the free flow of liquid through the indicator, said liquid indicator comprising a windowed tubular housing having a pair of outwardly slanted shoulders each in connection with an outset end portion defining an enlarged chamber interiorly thereof, a transparent cylinder coaxially positioned within the tubular housing in spaced relation thereto and having portions exposed exteriorly of the housing at the windows thereof and extending at opposite ends into the enlarged chambers but short of the outer ends thereof and forming passages around the ends of the transparent cylinder within the enlarged chambers for the passage of fluid under pressure, a pair of resilient gaskets surrounding the cylinder one adjacent each slanting shoulder, a pair of coiled springs one within each of the two chambers surrounding the cylinder and each spring in engagement at its inner end with one of the resilient gaskets, and a pair of heads interposed in the fluid system in screw-threaded connection with the tubular housing one at each end thereof and each in engagement with the outer end of one coiled spring to provide an abutment therefor whereby to place the spring under compression for exerting an inwardly directed axial pressure against the gasket to displace the same laterally against the cylinder and partially into the space between the cylinder and the housing to provide a floating mounting for the cylinder, the liquid passing through the indicator being free to pass around the cylinder ends to enter both chambers to exert pressure on the two gaskets to augment the pressure of the springs thereon.

2. For use in the pipeline of a closed circulatory fluid system to show the rate of flow and the condition of the fluid, a liquid indicator designed to be located in said pipeline and having a straight liquid passage through which all the liquid of the system passes and which is devoid of turns, constrictions and obstructions offering resistance to the free flow of liquid through the indicator, said liquid indicator comprising a windowed tubular housing having a pair of outwardly extended shoulders each in connection with an outset end portion defining an enlarged chamber interiorly thereof, a transparent cylinder coaxially positioned within the tubular housing in spaced relation thereto and extending at opposite ends into the enlarged chambers but short of the outer ends thereof and forming passages around the ends of the transparent cylinder within the enlarged chambers for the passage of fluid under pressure, a pair of resilient gaskets surrounding the cylinder one adjacent each shoulder, a pair of coiled springs one within each of the two chambers surround the cylinder and each spring in engagement at its inner end with one of the resilient gaskets, and a pair of heads interposed in the fluid system in screw threaded connection with the tubular housing one at each end thereof and each in engagement with the outer end of one coiled spring to provide an abutment therefor whereby to place the spring under compression for exerting an inwardly directed axial pressure against the gasket to displace the same laterally against the cylinder and partially into the space between the cylinder and the housing to provide a floating mounting for the cylinder, the liquid passing through the indicator being free to pass around the cylinder ends to enter both chambers to exert pressure on the two gaskets to augment the pressure of the springs thereon.

3. For use in the pipeline of a closed circulatory fluid system to show the rate of flow and the condition of the fluid, a liquid indicator designed to be located in said pipeline and having a straight liquid passage through which all the liquid of the system passes and which is devoid of turns, constrictions and obstructions offering resistance to the free flow of liquid through the indicator, said liquid indicator comprising a windowed tubular housing having a pair of outwardly extended shoulders each in connection with an outset end portion defining an enlarged chamber interiorly thereof, a transparent cylinder coaxially positioned within the tubular housing in spaced relation thereto and extending at opposite ends into the enlarged chambers but short of the outer ends thereof forming passages around the ends of the transparent cylinder in said enlarged chambers for the passage of fluid under pressure, a pair of heads interposed in the fluid system in screw threaded connection with an exterior face of the housing, one at each end thereof, a sealing gasket interposed between each end face of the housing and the head proximate thereto adapted, when compressed, to provide a liquid-tight seal between the housing and each head, a pair of resilient gaskets surrounding the cylinder, one adjacent each shoulder of the housing, and a pair of coiled springs one within each of the two housing chambers surrounding the cylinder and each spring in engagement at its inner end with one of the resilient gaskets and at its outer end in engagement with the proximate head to be thereby maintained under compression for exerting an axial pressure against the resilient gasket to displace the same laterally against the cylinder and partially into the space between the cylinder and the housing to provide a floating mounting for the cylinder, the liquid passing through the indicator being free to pass around the cylinder ends to enter both chambers to exert pressure on the two gaskets to augment the pressure of the springs thereon.

4. A pipe fitting for use in observing high pressure flow circulating through a piping system, comprising a protective metal casing provided centrally with diametrically opposed windows, an annular shoulder formed on the interior wall of said casing and spaced inwardly of each casing end, a tubular pipe coupling member threadably secured to the periphery of each end portion of the casing, each of said coupling members having its interior end wall pressed against the ends of the casing lying adjacent to it for forming a seal, a transparent fragile tubular member disposed within said casing, the ends of said tubular member being spaced from the adjacent interior end walls of the coupling members for permitting a substantial portion of the flow to pass to the outside surfaces of the end walls of the tube, said outside surfaces also being spaced from the adjacent interior walls of said casing to provide a ring-shaped chamber at each end of the tube for receiving said portion of the flow, a ring-shaped sealing member fitted about each end of the tube and bearing against said annular shoulders, and a spring surrounding in spaced relationship each end of the tube, each of said springs being compressed between its adjacent sealing member and the interior end wall of its adjacent coupling member, said sealing members being of substantially the same width as said ring-shaped chambers and also being formed of a material sufficiently distortable by said compressed spring to effect the seal between the casing and the tube when the couplings are threaded onto the said casing ends, the distortion of said sealing members providing the principal support for said tube, and the pressure of the flow into said ring-shaped chambers acting directly against the full width of said sealing members whereby the tightness of the seal between the casing and the tube increases as the flow pressure becomes greater, said seal between said casing ends and said coupling members preventing leakage across the threaded connection between the casing and the couplings.

5. An indicator conduit apparatus for observing fluid flow through a piping system including said apparatus, comprising a protective casing provided with a viewing window in the wall thereof, annular gasket-engaging shoulder portions formed on the interior wall of said casing and each shoulder portion spaced inwardly of a casing end, a pair of coupling members each secured to an end portion of the casing, each of the coupling members forming a seal with the end of the casing adjacent thereto, a transparent tubular member within said casing and viewable through said window, the ends of the tubular member being spaced from the adjacent interior walls of the coupling members for permitting fluid flow to the outside surfaces of the ends of the tubular member, said outside surfaces also being spaced from said casing to provide a ring-shaped chamber at each end of the tubular member for receiving said fluid flow, a pair of ring-shaped sealing members each fitted about an end of the tubular member and bearing against one of said annular shoulders and said transparent tubular member, and compression means urging each sealing member into sealing engagement with one of said shoulders and with said tubular member, the pressure of the fluid flow into said ring-shaped chambers acting directly against said sealing members whereby the tightness of the seal between the casing and the tubular member increases as the fluid pressure becomes greater.

6. An indicator conduit apparatus for observing fluid flow through a piping system including said apparatus, comprising a protective casing provided with a viewing window in the wall thereof, annular gasket-engaging shoulder portions formed on the interior wall of said casing and each shoulder portion spaced inwardly of a casing end, a pair of coupling members each secured to an end portion of the casing, each of the coupling members forming a seal with the end of the casing adjacent thereto, a transparent tubular member within said casing and viewable through said window, the ends of the tubular member being spaced from the adjacent interior walls of the coupling members for permitting fluid flow to the outside surfaces of the ends of the tubular member, said outside surfaces also being spaced from said casing to provide a ring-shaped chamber at each end of the tubular member for receiving said fluid flow, a pair of ring-shaped sealing members each fitted about an end of the tubular member and bearing against one of said annular shoulders and said transparent tubular member, and a pair of compression members each surrounding in spaced relationship an end portion of the tubular member and bearing against a sealing member, each of said compression members being narrower than its ring-shaped chamber and said sealing members being of substantially the same width as said ring-shaped chambers in the areas adjacent to said shoulders and being distortable under pressure to provide an effective seal, and the pressure of the fluid flow into said ring-shaped chambers acting directly against said sealing members whereby the tightness of the seal between the casing and the tubular member increases as the fluid pressure becomes greater.

ALBERT WITTLIN.

REFERENCES CITED

The following references are of record in the file of this patent:

UNITED STATES PATENTS

| Number | Name | Date |
|---|---|---|
| 148,285 | Cornelius | Mar. 19, 1874 |
| 781,042 | Wood | Jan. 31, 1905 |
| 828,108 | Graham | Aug. 7, 1906 |
| 927,403 | Cameron | July 6, 1909 |
| 1,565,448 | Hewitt | Dec. 15, 1925 |
| 1,910,752 | Coles | May 23, 1933 |
| 2,083,794 | Roby | June 15, 1937 |

FOREIGN PATENTS

| Number | Country | Date |
|---|---|---|
| 4,322 | Great Britain | Mar. 16, 1898 |
| 29,091 | Great Britain | Oct. 30, 1897 |

Disclaimer 2,624,808.—*Albert Wittlin*, Chicago, Ill. LIQUID FLOW INDICATOR. Patent dated Jan. 6, 1953. Disclaimer filed Dec. 22, 1955, by the inventor.
Hereby enters this disclaimer to claims 3 and 6 of said patent.
[*Official Gazette January 24, 1956.*]